(12) United States Patent
Hsu et al.

(10) Patent No.: US 11,845,193 B2
(45) Date of Patent: Dec. 19, 2023

(54) CROSS LASER CALIBRATION DEVICE AND CALIBRATION SYSTEM USING THE SAME

(71) Applicant: INDUSTRIAL TECHNOLOGY RESEARCH INSTITUTE, Hsinchu (TW)

(72) Inventors: Sheng-Chieh Hsu, Taipei (TW); Sheng-Han Hsieh, Tainan (TW); Mou-Tung Hsieh, Hsinchu (TW); Tien-Yun Chi, Taichung (TW); Kuo-Feng Hung, Taoyuan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 220 days.

(21) Appl. No.: 17/562,606

(22) Filed: Dec. 27, 2021

(65) Prior Publication Data
US 2023/0129623 A1 Apr. 27, 2023

(30) Foreign Application Priority Data
Oct. 27, 2021 (TW) ................................. 110139886

(51) Int. Cl.
*B25J 9/16* (2006.01)
*B25J 9/10* (2006.01)
*G01B 21/04* (2006.01)

(52) U.S. Cl.
CPC ............... *B25J 9/1692* (2013.01); *B25J 9/10* (2013.01); *G01B 21/042* (2013.01)

(58) Field of Classification Search
CPC ......... B25J 9/10; B25J 9/1692; G01B 21/042; G05B 2219/39025
See application file for complete search history.

(56) References Cited

U.S. PATENT DOCUMENTS 7,684,898 B2   3/2010   Pagel et al.
8,812,257 B2   8/2014   Kohler et al.
(Continued)

FOREIGN PATENT DOCUMENTS

CN   103706945 B   2/2016
CN   111347136 A   6/2020
(Continued)

OTHER PUBLICATIONS

Ayadi et al., "Fully Automatic Needle Calibration for Robotic-Assisted Puncture on Small Animals", IEEE/NIH Life Science Sysytems and Applications Workshop, 2007, pp. 85-88.
Bai et al., "Kinematic Calibration and Pose Measurement of a Medical Parallel Manipulator by Optical Position Sensors", Seventh International Conference on Control, Automation, Robotics And Vision (ICARCV'02), Singapore, Dec. 2002, pp. 419-424.
(Continued)

*Primary Examiner* — Dale Moyer
(74) *Attorney, Agent, or Firm* — Birch, Stewart, Kolasch & Birch, LLP

(57) ABSTRACT

A cross laser calibration device used to calibrate a tool center point is provided. The calibration device includes a coordinate orifice plate, a set of cross laser sensors and a rotational and translational movement mechanism. The coordinate orifice plate has an orifice center point. The set of cross laser sensors is arranged on the coordinate orifice plate to generate cross laser lines intersecting at the orifice center point. The set of cross laser sensors is driven by the second motor to rotate around the center point of the second motor, wherein the orifice center point has an off-axis setting relative to the center point of the second motor.

16 Claims, 12 Drawing Sheets

(56) References Cited

U.S. PATENT DOCUMENTS

| | | | |
|---|---|---|---|
| 9,002,516 B2 | 4/2015 | Chiu et al. | |
| 2009/0182454 A1* | 7/2009 | Donoso | H01L 21/681 |
| | | | 700/254 |
| 2014/0365006 A1* | 12/2014 | Trompeter | B25J 9/1692 |
| | | | 700/254 |
| 2016/0016317 A1* | 1/2016 | Trompeter | B25J 9/1692 |
| | | | 700/254 |
| 2016/0279800 A1* | 9/2016 | Onda | B25J 9/1692 |
| 2016/0368147 A1* | 12/2016 | Li | B25J 9/1692 |
| 2018/0299263 A1* | 10/2018 | Jywe | B23Q 17/24 |

FOREIGN PATENT DOCUMENTS

| | | |
|---|---|---|
| JP | 7-191736 A | 7/1995 |
| TW | I404609 B1 | 8/2013 |
| TW | 202000405 A | 1/2020 |
| TW | I701123 B | 8/2020 |
| TW | I1712473 B | 12/2020 |

OTHER PUBLICATIONS

Hulke et al., "Single Camera based Motion Tracking for Minimally Invasive Surgery", 22nd Mediterranean Conference on Control and Automation (MED), University of Palermo, Palermo, Italy, Jun. 16-19, 2014, pp. 356-361.

Navarro-Alarcon et al., "Adaptive Image-based Positioning of RCM Mechanisms Using Angle and Distance Features", IEEE/RSJ International Conference on Intelligent Robots and Systems (IROS), Congress Center Hamburg, Sep. 28-Oct. 2, 2015, Hamburg, Germany, pp. 5403-5409.

Wilson et al., "Evaluating Remote Centers of Motion for Minimally Invasive Surgical Robots by Computer Vision", IEEE/ASME International Conference on Advanced Intelligent Mechatronics, Montréal, Canada, Jul. 6-9, 2010, pp. 1413-1418.

Wu et al., "Simultaneous Hand-Eye, Tool-Flange, and Robot-Robot Calibration for Comanipulation by Solving the AXB = YCZ Problem", IEEE Transactions on Robotics, vol. 32, No. 2, Apr. 2016, pp. 413-428.

* cited by examiner

CROSS LASER CALIBRATION DEVICE AND CALIBRATION SYSTEM USING THE SAME

This application claims the benefit of Taiwan application Serial No. 110139886, filed Oct. 27, 2021, the disclosure of which is incorporated by reference herein in its entirety.

TECHNICAL FIELD

The disclosure relates in general to a calibration system, and more particularly to a cross laser calibration device and a calibration system and a calibration method using the same for calibrating the tool center point of a robotic arm.

BACKGROUND

Examples of the tool used in a robotic arm include welding tool, grinding tool and drilling tool. When the robotic arm is operated to perform welding, grinding or drilling tasks, the coordinates of the tool center point (TCP) of the robotic arm need to be calibrated first, so that the tool can properly move on a predetermined path or trajectory.

However, the robotic arms have different manufacturers, and each manufacturer has its own calibration system and calibrator for robot. During the calibration process, when the movement of the tool is performed, the calibrator needs to perform two-way communication with its own controller of the robotic arm. Thus, the calibrator cannot be shared by the robotic arms of different manufacturers. When the robotic arm and the calibrator do not belong to the same manufacturer, conventional calibrator needs to be adjusted according to the communication protocol of the robotic arm of the other manufacturer, therefore the efficiency is poor. Furthermore, since the robotic arms of different manufacturers cannot share the same calibrator, calibration cost increases relatively.

SUMMARY

The present disclosure is related to a cross laser calibration device and a calibration system used to calibrate the tool center point of a robotic arm.

According to one embodiment, a cross laser calibration device is provided. The cross laser calibration device includes a coordinate orifice plate, a set of cross laser sensors, and a rotational and translational movement mechanism. The coordinate orifice plate has an orifice center point. The set of cross laser sensors is arranged on the coordinate orifice plate to generate cross laser lines intersecting at the orifice center point. The rotational and translational movement mechanism is used to drive the coordinate orifice plate and the set of cross laser sensors. The rotational and translational movement mechanism includes a first motor, a uni-axis actuator, a second motor, and a connecting rod. The first motor is used to drive the uni-axis actuator to generate a translational movement in the first direction. The second motor is arranged on the uni-axis actuator to generate a rotational movement perpendicular to the first direction. The connecting rod is connected between the second motor and the coordinate orifice plate, wherein the orifice center point has an off-axis setting relative to the center point of the second motor.

According to another embodiment, a calibration system used to calibrate the tool center point of a robotic arm is provided. The calibration system includes a coordinate orifice plate, a set of cross laser sensors, a rotational and translational movement mechanism, and a processing unit. The coordinate orifice plate has an orifice center point. The set of cross laser sensors is arranged on the coordinate orifice plate to generate cross laser lines intersecting at the orifice center point. The rotational and translational movement mechanism is used to drive the coordinate orifice plate and the set of cross laser sensors. The rotational and translational movement mechanism includes a first motor, a uni-axis actuator, a second motor, and a connecting rod. The first motor is used to drive the uni-axis actuator to generate a translational movement in the first direction. The second motor is arranged on the uni-axis actuator to generate a rotational movement perpendicular to the first direction. The connecting rod is connected between the second motor and the coordinate orifice plate, wherein the orifice center point has an off-axis setting relative to the center point of the second motor. The processing unit is used to receive the initial position information of the robotic arm and two rotation angle signals of the first motor and the second motor and control the first motor and the second motor to rotate.

The above and other aspects of the disclosure will become better understood with regard to the following detailed description of the embodiment(s). The following description is made with reference to the accompanying drawings.

Figure 1:
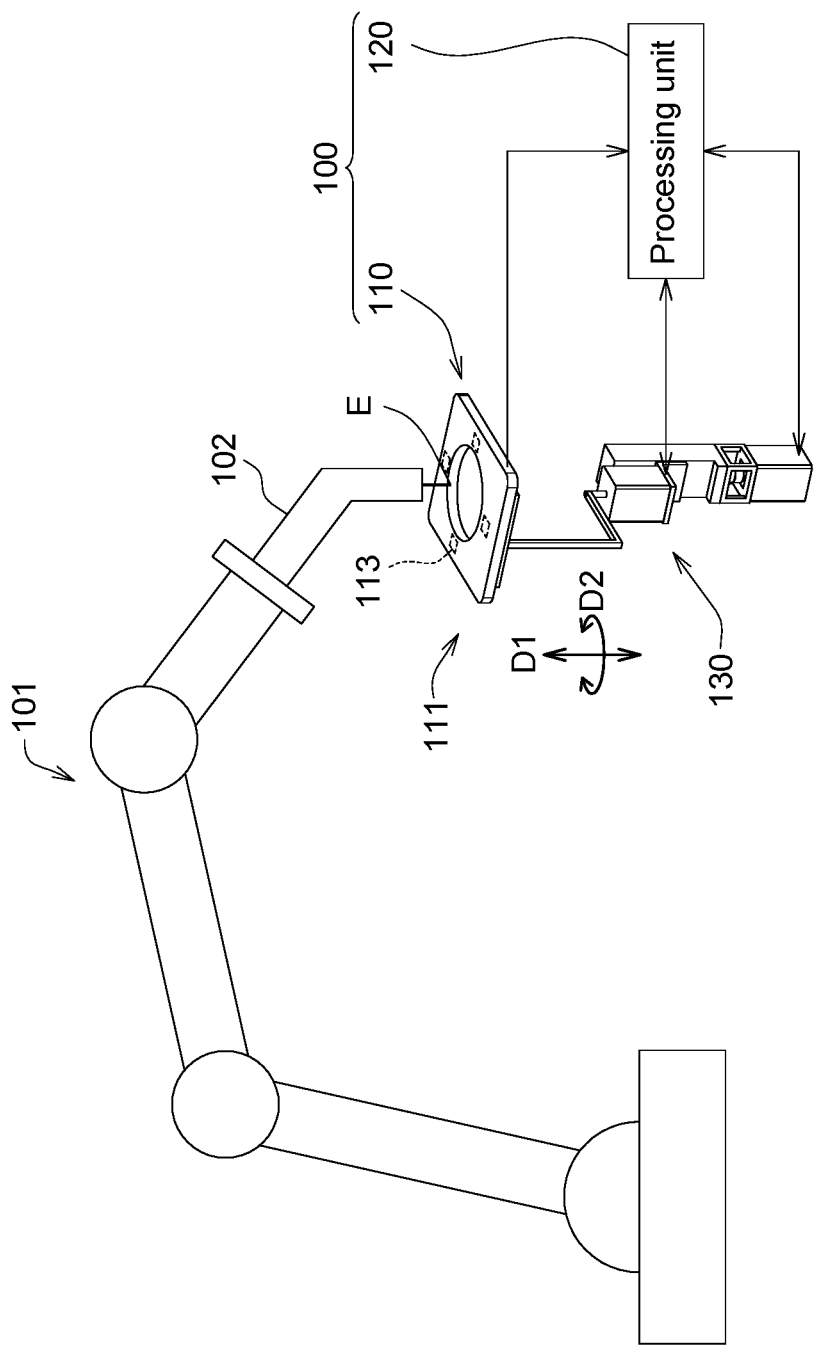
FIG. 1 is a schematic diagram of a calibration system according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Technical solutions for the embodiments of the present application are clearly and thoroughly disclosed with accompanying drawings. Obviously, the embodiments disclosed below are only some rather than all of the embodiments of the present disclosure. All embodiments obtained by anyone ordinarily skilled in the art of the present application according to the disclosed embodiments of the present disclosure are within the scope of protection of the present disclosure if the obtained embodiments are obvious.

Besides, the disclosed features, structures or characteristics can be combined in one or more embodiments in any suitable way. In the following disclosure, many detailed descriptions are provided for the embodiments of the present application to be better and fully understood. However, anyone ordinarily skilled in the art of the disclosure will understand that technical solution for the present application can be implemented without one or more of the details disclosed below or can be implemented using other methods, devices, or steps. In some circumstances, generally known methods, devices, implementations, or operations of the technical solution capable of implementing the present disclosure are not necessarily illustrated or disclosed in greater details lest the aspects of the present application might be distracted.

Figure 2A:
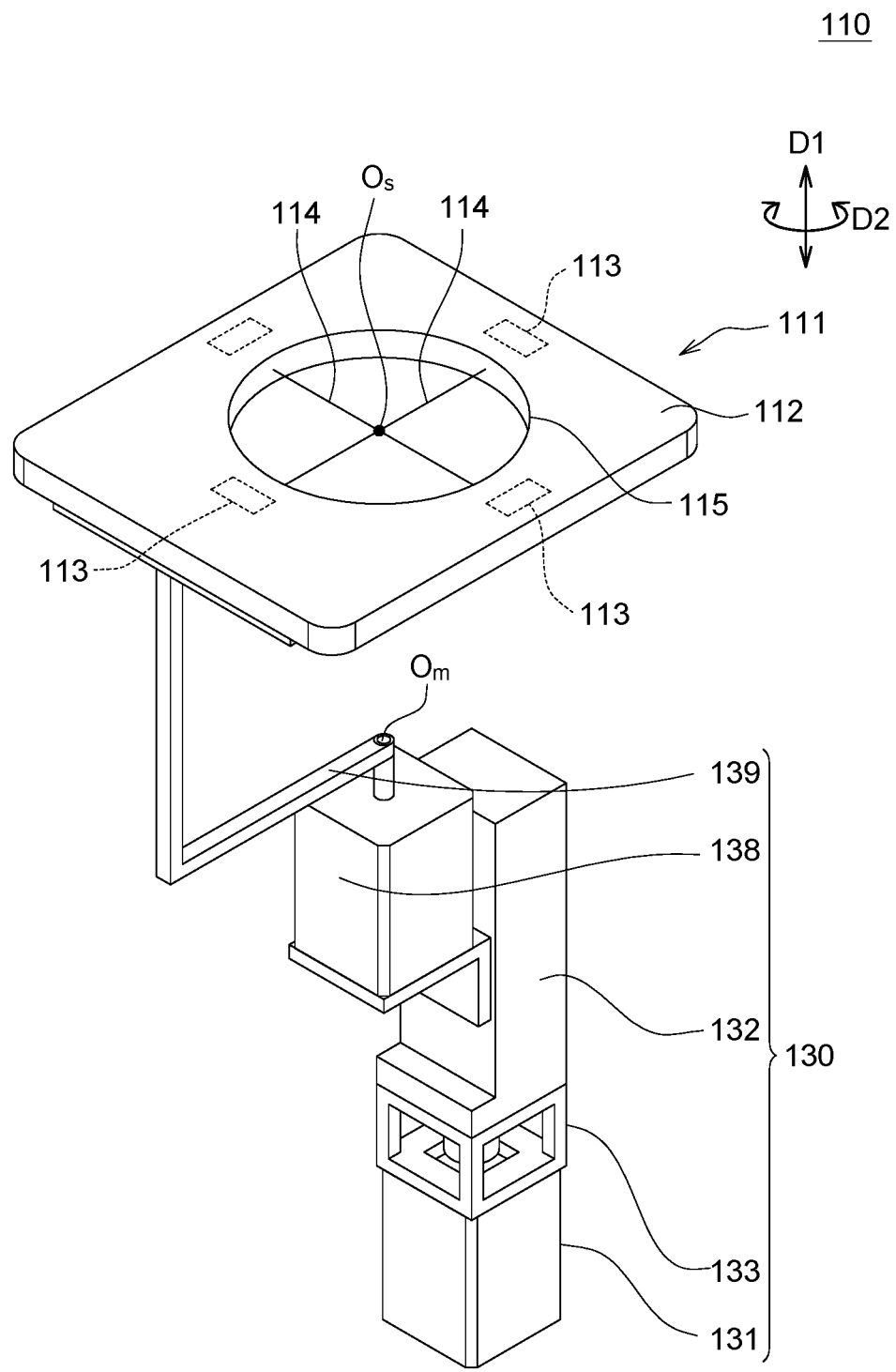
FIGS. 2A to 2C are schematic diagrams of a cross laser calibration device according to an embodiment of the present disclosure.
Figure 2B:
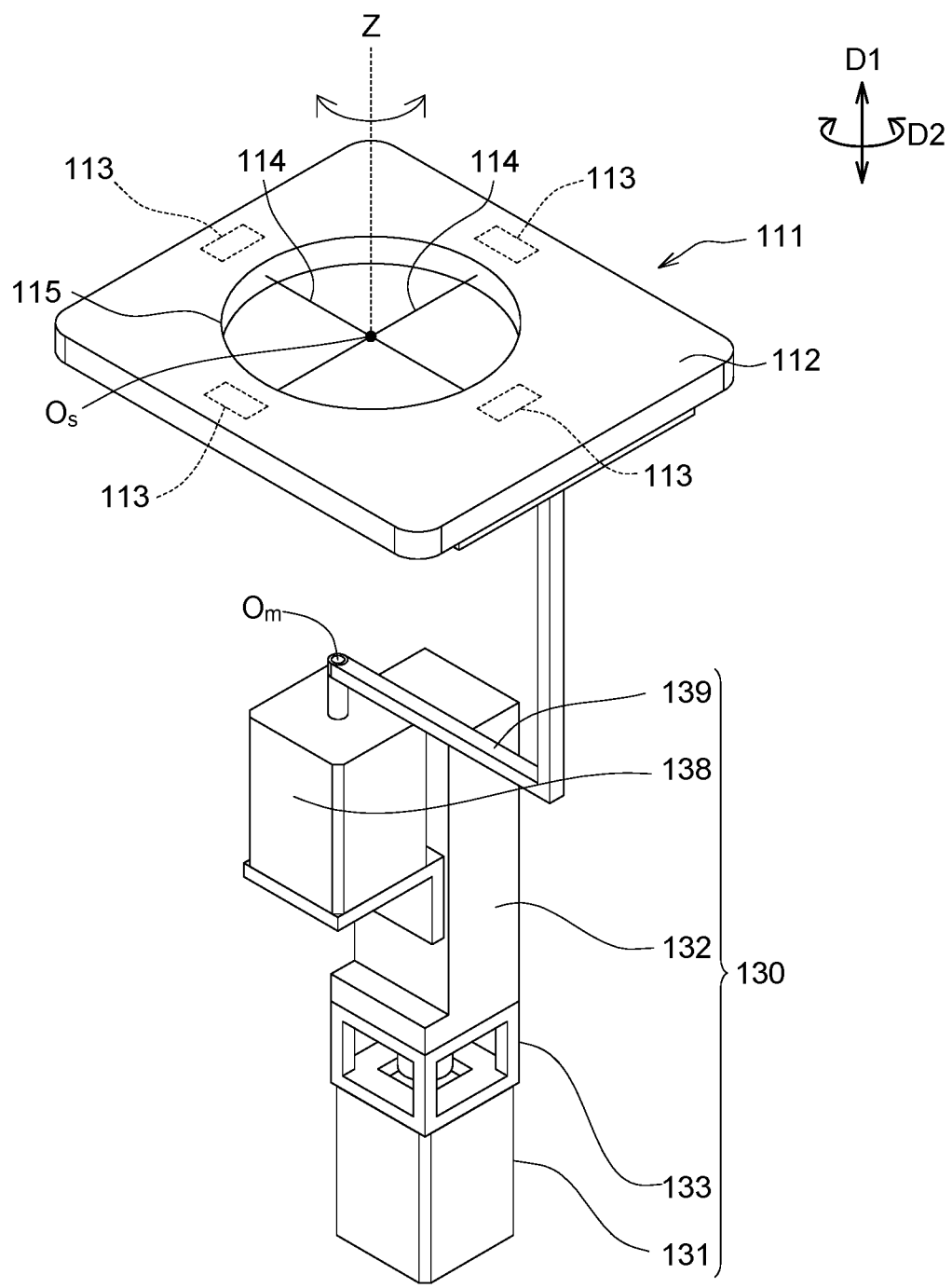
Figure 2C:
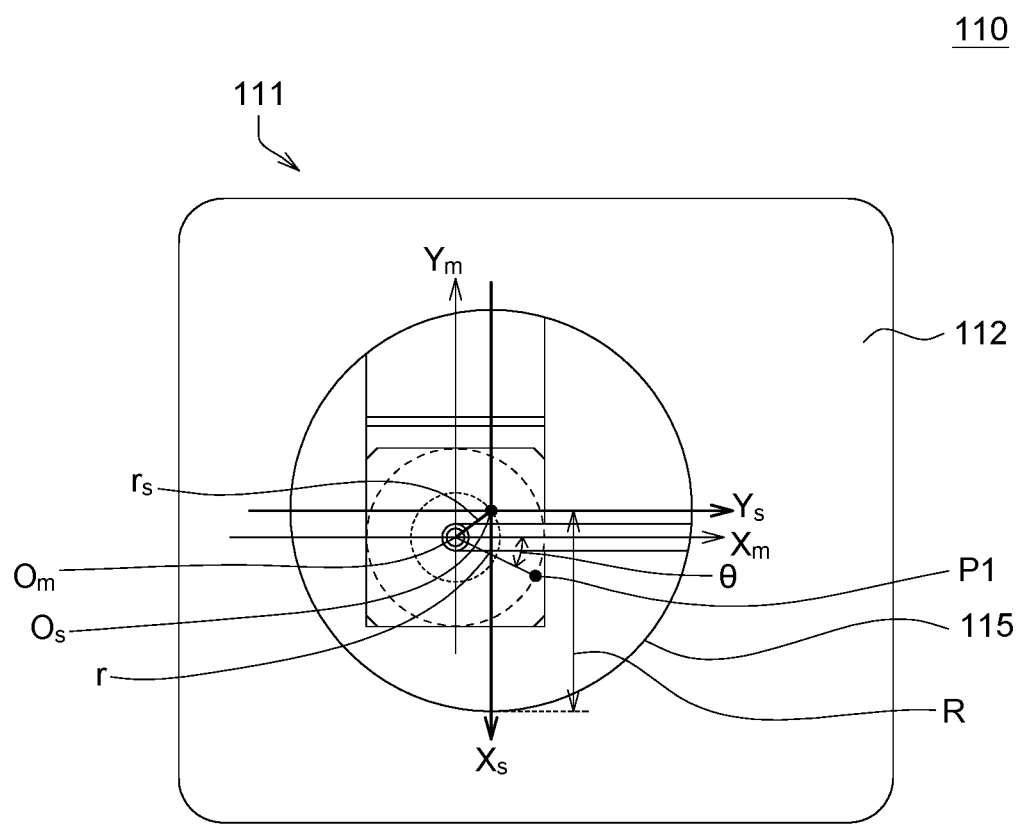

Refer to FIG. 1 and FIGS. 2A-2C. FIG. 1 is a schematic diagram of a calibration system 100 according to an embodiment of the present disclosure. FIGS. 2A to 2C are schematic diagrams of a cross laser calibration device 110 according to an embodiment of the present disclosure. The calibration system 100 includes a cross laser calibration device 110 and a processing unit 120. The processing unit 120 is used to control the rotation of two motors of the cross laser calibration device 110 and to record and receive two rotation angle signals and two blocking signals of the cross laser sensors 113 for the calibration of the coordinates of the tool center point E of the robotic arm 101. The processing unit 120 can be realized by a micro-processor, a micro-controller or an industrial computer composed of integrated circuit elements.

In an embodiment, the cross laser calibration device 110 includes a coordinate orifice plate 111, a set of cross laser sensors 113, and a rotational and translational movement mechanism 130. The cross laser sensors 113 are arranged on the coordinate orifice plate 111. The coordinate orifice plate 111 is arranged on the rotational and translational movement mechanism 130. The rotational and translational movement mechanism 130 can synchronously drive the coordinate orifice plate 111 and the set of cross laser sensors 113 to rotate or translate. In the present embodiment, the orifice center point $O_s$ of the coordinate orifice plate 111 and the cross laser lines 114 generated by the set of cross laser sensors 113 can form a cross laser coordinate system ($X_s$, $Y_s$, $Z_s$), and the second motor of the rotational and translational movement mechanism 130 has a coordinate system ($X_m$, $Y_m$, $Z_m$) whose origin is the center point $O_m$ of the second motor. The cross laser calibration device 110 is driven by the second motor to revolve and rotate around the center point $O_m$ of the second motor. The cross laser calibration device 110 calibrates the coordinates of the tool center point (that is, the coordinates of the terminal E) of the robotic arm 101 using an off-axis setting relationship between the cross laser coordinate system ($X_s$, $Y_s$, $Z_s$) and the coordinate system ($X_m$, $Y_m$, $Z_m$) whose origin is the center point $O_m$ of the second motor.

In some embodiments, the tool 102 refers to any objects arranged on the robotic arm 101, such as clamper, welding gun, cutter or grinder, and the tool center point refers to the terminal E on the end of the tool 102.

Refer to FIGS. 2A and 2B. The coordinate orifice plate 111 has a plate 112, a circular orifice 115, and an orifice center point $O_s$. The region of the circular orifice 115 is the sensing range of the cross laser sensors 113. The orifice center point $O_s$ is located at the center of the circular orifice 115 and is known relative to the center point $O_m$ of the coordinate system of the second motor. As indicated in FIG. 2A, the cross laser sensors 113 are arranged on the plate 112 to generate cross laser lines 114 intersecting at the orifice center point $O_s$ (that is, the center point of the circular orifice 115). When the robotic arm 101 moves the tool 102 to be within the sensing range of the cross laser sensor 113, the tool 102 intersects the cross laser lines 114 along with the rotation of the cross laser lines 114 to generate at least one set of blocking signals and determine the coordinates of the tool center point according to rotation angle signals of the second motor corresponding to the set of blocking signals. In the present embodiment, a set of blocking signals is four times of blocking signals, but the present disclosure is not limited thereto. Details of the method for calibrating tool center point are disclosed below with reference to FIGS. 4A to 4E.

Refer to FIGS. 2A and 2B. The rotational and translational movement mechanism 130 includes a first motor 131, a uni-axis actuator 132, a coupling part 133, a second motor 138, and a connecting rod 139. The coupling part 133 is arranged between the first motor 131 and the uni-axis actuator 132. The uni-axis actuator 132 uses the first motor 131 to provide a torque to generate a translational movement in a first direction D1 (that is, the Z-axis direction). The second motor 138 is arranged on the uni-axis actuator 132 to move in the first direction D1. The second motor 138 can provide a rotational movement D2 perpendicular to the first direction D1 for the coordinate orifice plate 111.

In the present embodiment, the connecting rod 139 is connected between the second motor 138 and the coordinate orifice plate 111. The second motor 138 can synchronously drive the connecting rod 139 and the coordinate orifice plate 111 to perform a rotational movement. Since the structure of the coordinate orifice plate 111, the length of the connecting rod 139, and the distance by which the orifice center point $O_s$ is deviated from the center point $O_m$ of the second motor 138 are already known at the design stage, the coordinates of the orifice center point $O_s$ of the coordinate orifice plate 111 relative to the center point $O_m$ of the coordinate system of the second motor 138 can be obtained through the conversion of coordinate systems.

Refer to FIG. 2C. The orifice center point $O_s$ of the coordinate orifice plate 111 has a rotation radius $r_s$ relative to the center point $O_m$ of the second motor 138, so that the orifice center point $O_s$ can have a rotational movement around the center point $O_m$ of the second motor 138. In the present embodiment, the orifice center point $O_s$ is deviated from the center point $O_m$ of the second motor 138 by a predetermined distance, that is, the orifice center point $O_s$ has an off-axis setting relative to the center point $O_m$ of the second motor 138. Additionally, the circular orifice 115 of the coordinate orifice plate 111 has a sensing radius R, which is known and can be greater than two or more than two times of the rotation radius $r_s$. In one embodiment, the sensing radius R is greater than or equivalent to four times of the rotation radius $r_s$.

Refer to FIG. 2C. Suppose a first point P1 is within the sensing range of the cross laser lines 114 and has an unknown distance r and an unknown azimuth (angle θ) relative to the center point $O_m$ of the coordinate system of the second motor 138. When the coordinate orifice plate 111 is rotated anti-clockwise around the center point $O_m$ of the second motor 138, based on the concept of relative movement, it can be imagined that the coordinate orifice plate 111 does not move but the first point P1 is rotated clockwise around the center point $O_m$ of the second motor 138. How the calibration device calculates the coordinates of the first point P1 relative to the center point $O_m$ of the coordinate system of the second motor 138 is exemplified below with accompanying drawings for the calculation of the distance r and azimuth (angle θ) of the first point P1 relative to the center point $O_m$ of the coordinate system of the second motor 138, but the present disclosure is not limited thereto.

Figure 3:
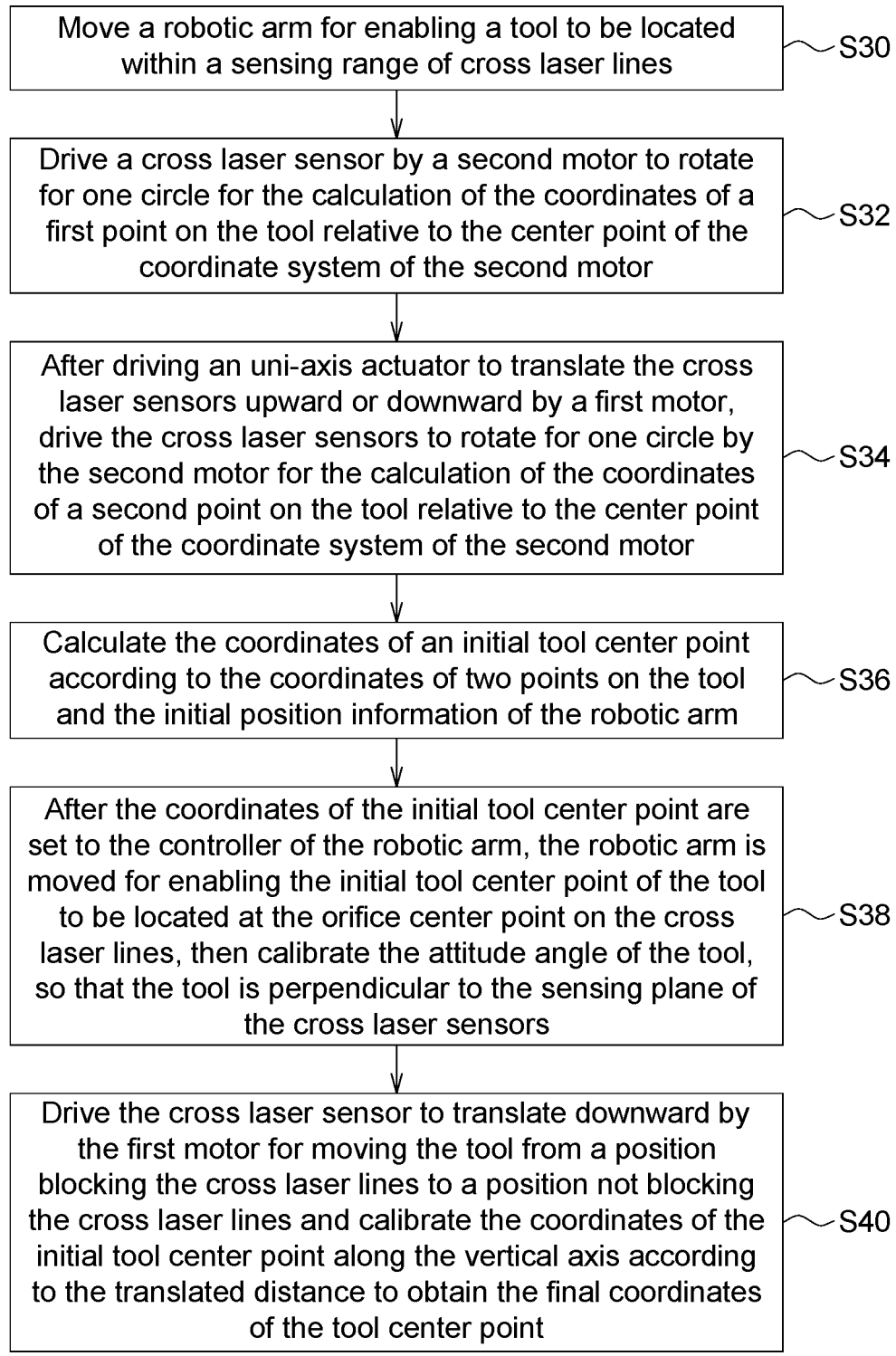
FIG. 3 is a flowchart of a method for calibrating tool center point according to an embodiment of the present disclosure.

Refer to FIGS. 1, 2A, 2B, 3, 6A and 6B. FIG. 3 is a flowchart of a method for calibrating tool center point according to an embodiment of the present disclosure.

Firstly, in step S30, a robotic arm 101 is moved for enabling a tool 102 to be located within a sensing range of the cross laser lines 114.

In step S32, the cross laser sensors 113 are driven by a second motor 138 to rotate for one circle for the calculation of the coordinates of a first point P1 on the tool 102 relative to the center point Om of the coordinate system of the second motor 138.

In step S34, after the uni-axis actuator 132 is driven by a first motor 131 to translate the cross laser sensors 113 upward or downward, the cross laser sensors 113 are driven by the second motor 138 to rotate for one circle for the calculation of the coordinates of a second point P2 on the tool 102 relative to the center point Om of the coordinate system of the second motor 138.

In step S36, the coordinates of an initial tool center point To are calculated according to the coordinates of the two points (P1 and P2) on the tool 102 and the initial position information of the robotic arm 101. In step S38, after the coordinates of the initial tool center point To are set to the controller of the robotic arm 101, the robotic arm 101 is moved for enabling the initial tool center point To of the tool 102 to be located at the orifice center point Os on the cross laser lines 114, then the attitude angle of the tool 102 is calibrated, so that the tool 102 is perpendicular to the sensing plane of the cross laser sensor 113.

In step S40, the uni-axis actuator 132 is driven by the first motor 131 to translate the cross laser sensors 113 downward for moving the tool 102 from a position blocking the cross laser lines 114 to a position not blocking the cross laser lines 114, and the coordinates of the initial tool center point To are calibrated along the vertical axis according to the translated distance to obtain the final coordinates of the tool center point (that is, the final coordinates of the terminal E).

Referring to FIGS. 4A to 4E, schematic diagrams of the cross laser sensors 113 rotated for one circle for the calculation of the coordinates of a first point P1 on a tool 102 relative to the center point $O_m$ of the coordinate system of the second motor 138 are shown.

Figure 4A:
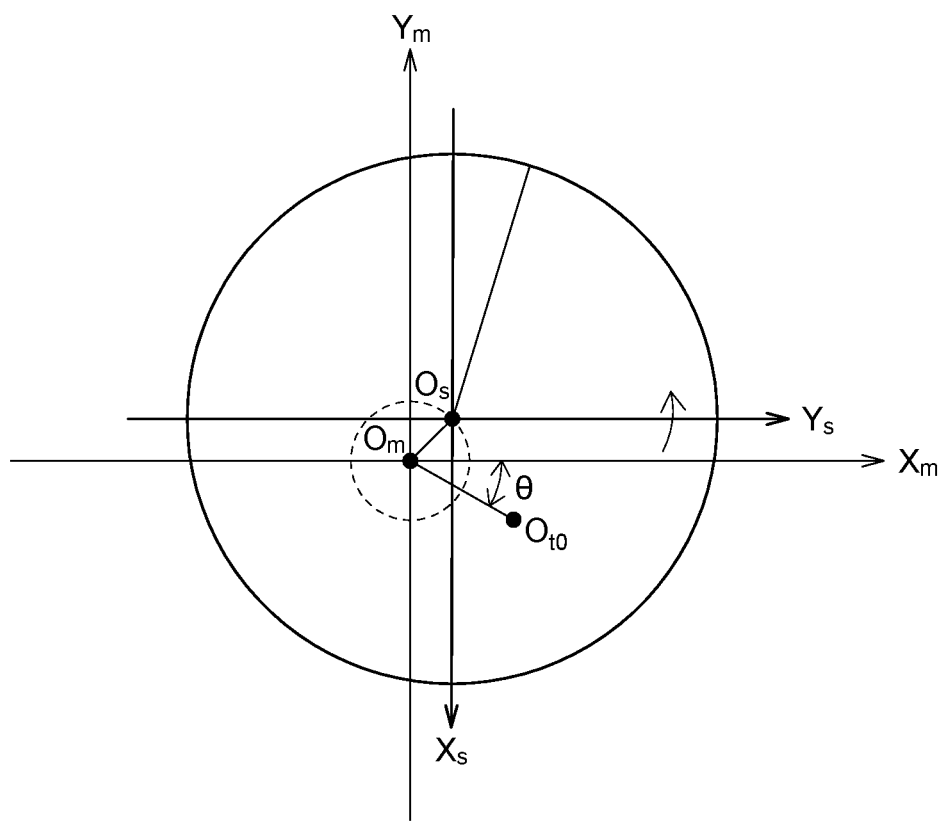
FIGS. 4A to 4E are schematic diagrams of the cross laser sensors rotated for one circle for the calculation of the coordinates of any point on the tool within the sensing range relative to the center point of the coordinate system of the second motor.

In FIG. 4A, when the robotic arm 101 is moved for enabling the tool 102 to be located within the sensing range of the cross laser lines 114 (equivalent to step S30), the robotic arm 101 is halted, and the initial position information of the robotic arm 101 is read and recorded to the processing unit 120, wherein, the coordinates of the first point P1 relative to the center point $O_m$ of the coordinate system of the second motor 138 are unknown, the coordinates of the orifice center point $O_s$ relative to the center point $O_m$ of the coordinate system of the second motor 138 are known, the conversion relationship from the center point $O_m$ of the coordinate system of the second motor 138 relative to the base coordinate system of the robotic arm 101 is known, and the first point P1 on the tool 102 is located at the initial point $O_{r0}$.

Figure 4B:
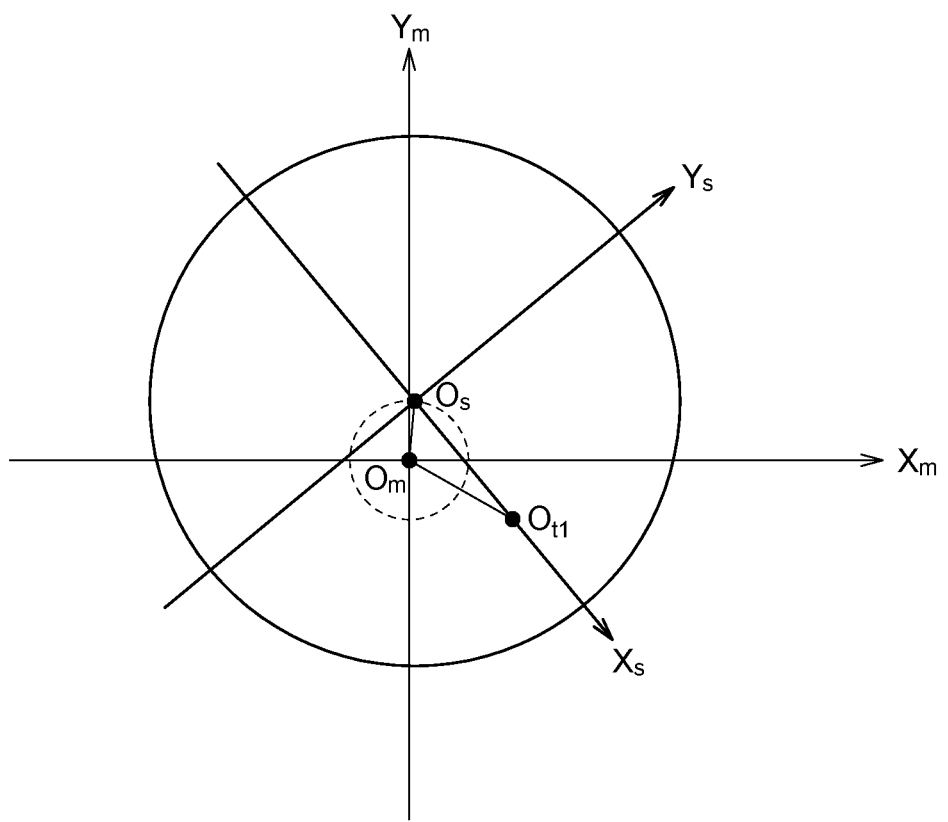

Then, as indicated in FIG. 4B, the coordinate system ($X_s$, $Y_s$, $Z_s$) of the cross laser sensor 113 is rotated until the $X_s$ axis of the cross laser lines 114 intersects the tool 102 at the first blocking point $O_{t1}$. Meanwhile, the cross laser sensor 113 generates a first blocking signal, and the processing unit 120 records the first blocking signal of the cross laser sensor 113 and the rotation angle $\varnothing_1$ of the second motor 138.

Figure 4C:
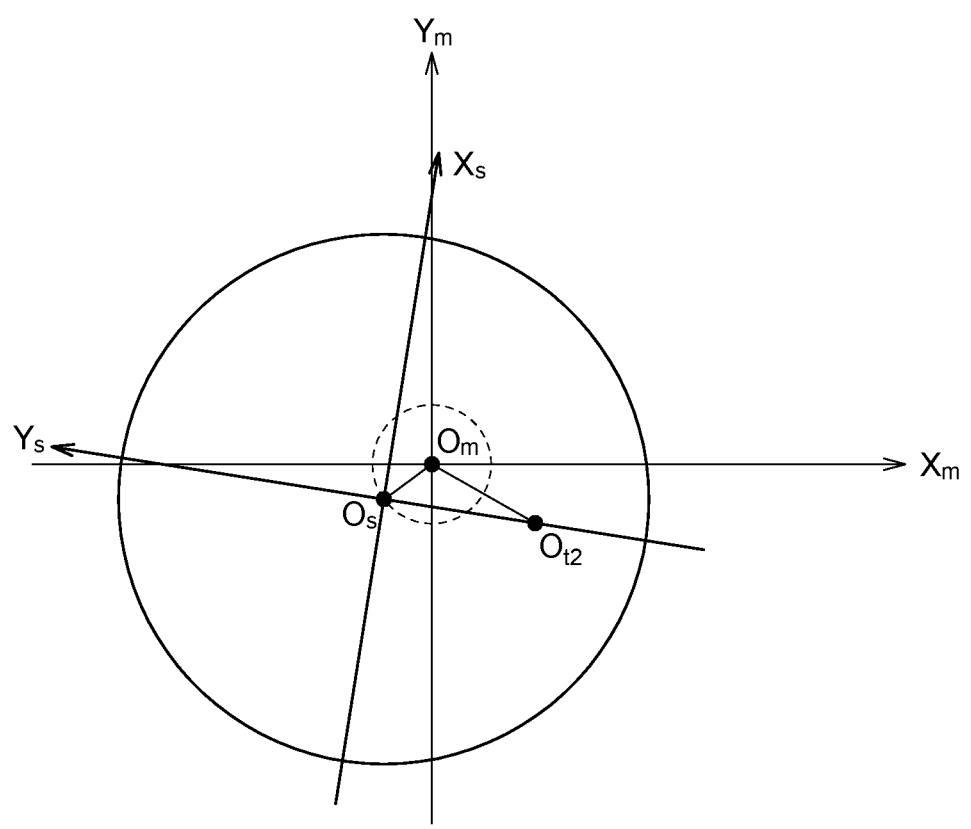

As indicated in FIG. 4C, the coordinate system ($X_s$, $Y_s$, $Z_s$) of the cross laser sensor 113 is rotated until the $Y_s$ axis of the cross laser lines 114 intersects the tool 102 at the second blocking point $O_{t2}$. Meanwhile, the cross laser sensor 113 generates a second blocking signal, and the processing unit 120 records the second blocking signal of the cross laser sensor 113 and the rotation angle $\varnothing_2$ of the second motor 138.

Figure 4D:
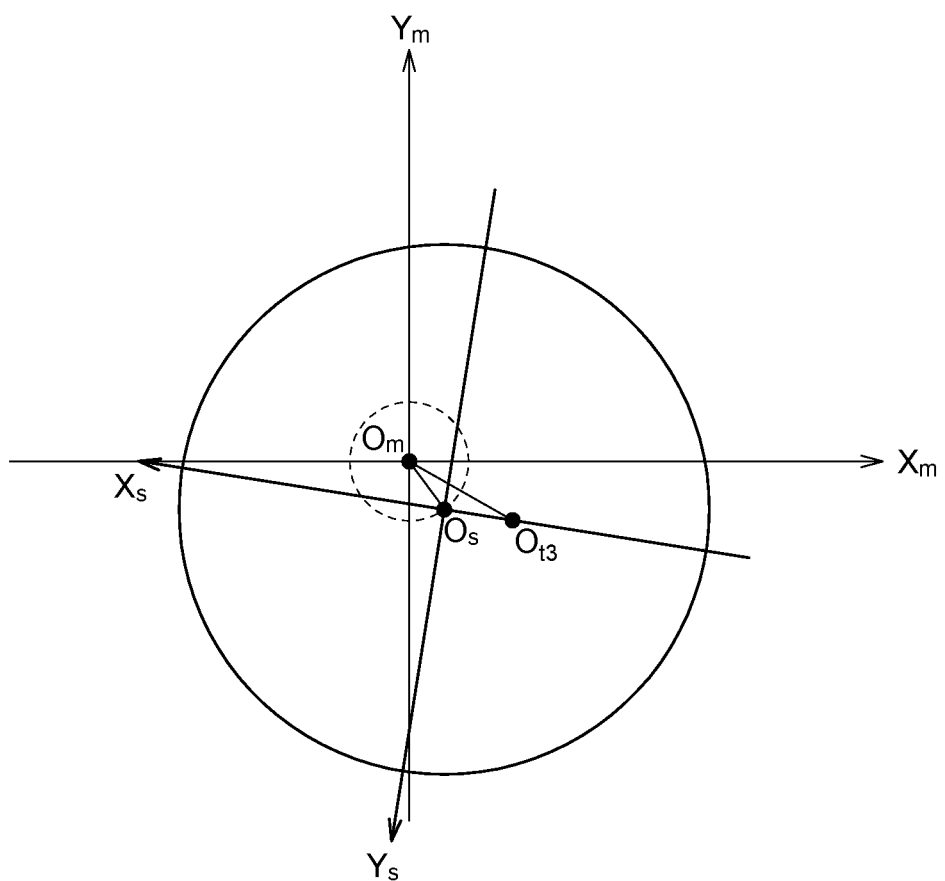
Figure 4E:
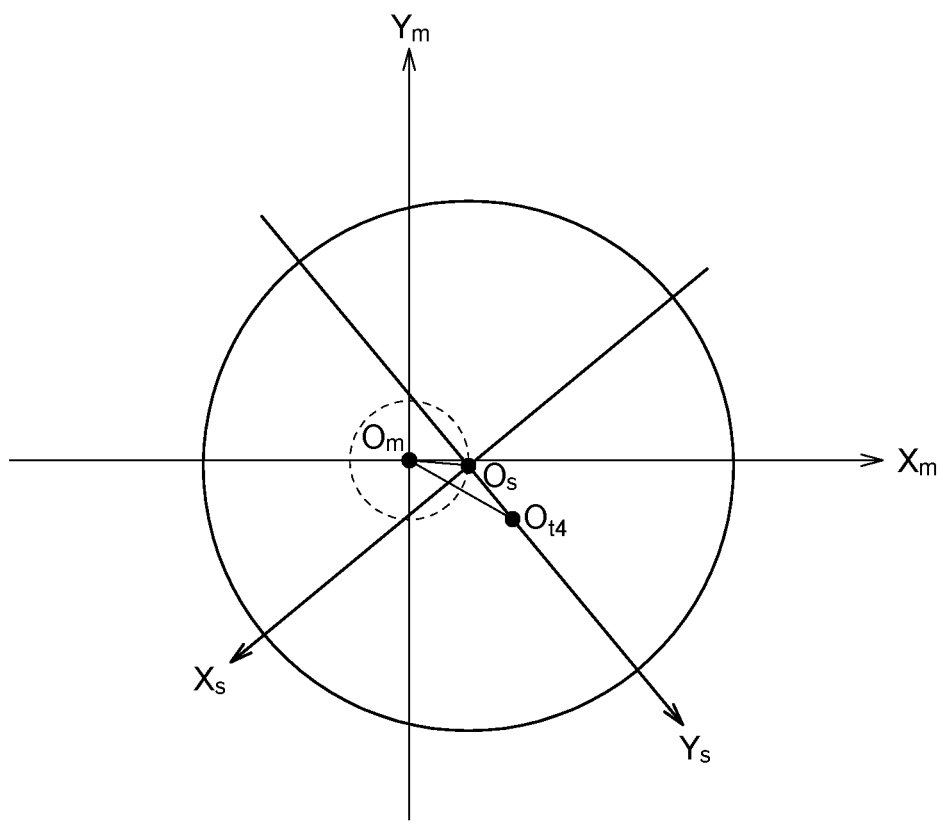

As indicated in FIG. 4D, the coordinate system ($X_s$, $Y_s$, $Z_s$) of the cross laser sensor 113 is rotated until the $X_s$ axis of the cross laser lines 114 intersects the tool 102 at the third blocking point $O_{t3}$. Meanwhile, the cross laser sensor 113 generates a third blocking signal, and the processing unit 120 records the third blocking signal of the cross laser sensor 113 and the rotation angle $\varnothing_3$ of the second motor 138. As indicated in FIG. 4E, the coordinate system ($X_s$, $Y_s$, $Z_s$) of the cross laser sensor 113 is rotated until the $Y_s$ axis of the cross laser lines 114 intersects the tool 102 at the fourth blocking point $O_{t4}$ Meanwhile, the cross laser sensor 113 generates a fourth blocking signal, and the processing unit 120 records the fourth blocking signal of the cross laser sensor 113 and the rotation angle $\varnothing_4$ of the second motor 138.

Through the above process, the processing unit 120 can obtain the first set of blocking signals and the rotation angle signals ($\varnothing_1$, $\varnothing_2$, $\varnothing_3$, $\varnothing_4$) of the second motor 138 and calculate the coordinates of the first point P1 on the tool 102 relative to the center point $O_m$ of the coordinate system of the second motor 138 according to the first set of rotation angle signals ($\varnothing_1$, $\varnothing_2$, $\varnothing_3$, $\varnothing_4$) of the second motor 138.

Figure 5:
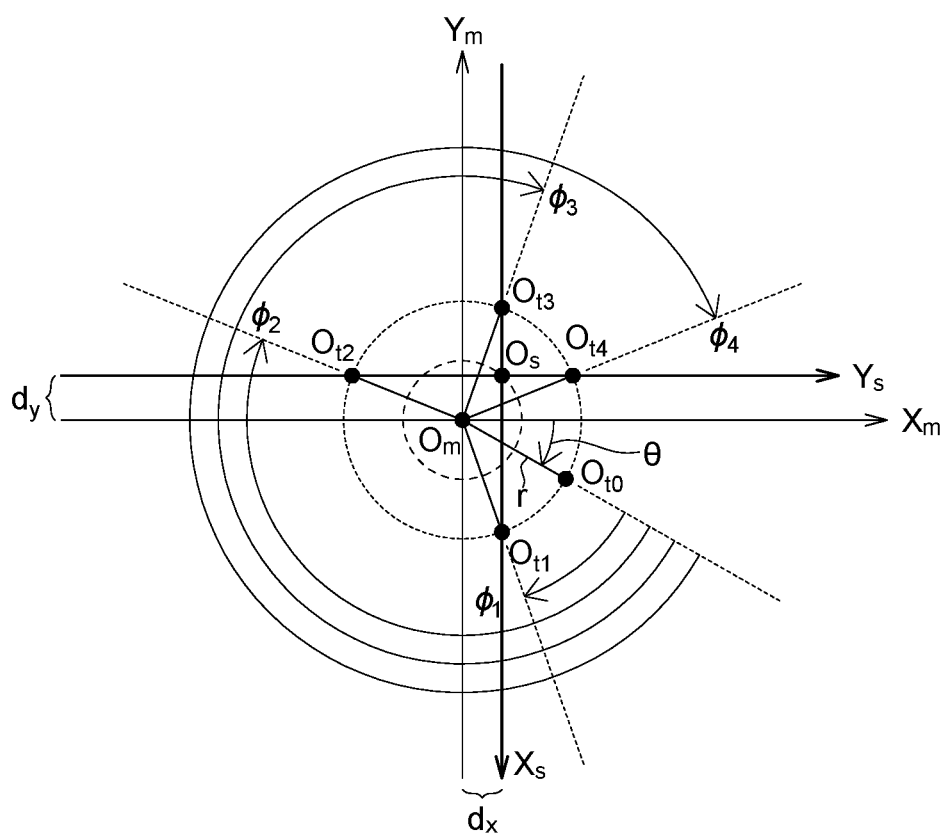
FIG. 5 is a movement trajectory of any point on the tool within the sensing range observed according to relative movement in the coordinate system of the cross laser sensor, wherein the movement trajectory includes an initial point, a first blocking point, a second blocking point, a third blocking point, and a fourth blocking point.

Referring to FIG. 5, a movement trajectory of a first point P1 (that is, initial point $O_{r0}$) sequentially intersecting the cross laser lines 114 at a first blocking point $O_{t1}$, a second blocking point $O_{t2}$, a third blocking point $O_{t3}$, and a fourth blocking point $O_{t4}$ is observed according to relative movement (the first point P1 moves but the cross laser sensor 113 does not move) in the coordinate system ($X_s$, $Y_s$, $Z_s$) of the cross laser sensors 113 is shown. The initial point $O_{r0}$ has a predetermined distance r and a predetermined azimuth θ relative to the center point $O_m$ of the coordinate system of the second motor 138. The first blocking point $O_{t1}$ has a first angle $\varnothing_1$ relative to the initial point $O_{r0}$; the second blocking point $O_{t2}$ has a second angle $\varnothing_2$ relative to the initial point $O_{r0}$; the third blocking point $O_{t3}$ has a third angle $\varnothing_3$ relative to the initial point $O_{r0}$; the fourth blocking point $O_{t4}$ has a fourth angle $\varnothing_4$ relative to the initial point $O_{r0}$. When the coordinate orifice plate 111 is rotated anti-clockwise around the center point $O_m$ of the second motor 138, based on the concept of relative movement, it can be imagined that the coordinate orifice plate 111 does not move, but the first point P1 on the tool 102 is rotated clockwise around the center point $O_m$ of the second motor 138. The coordinates of the first point P1 on the tool 102 relative to the center point $O_m$ of the coordinate system of the second motor 138 can be obtained by resolving the equation of the movement trajectory as follows:

the position of the initial point $O_{r0}$ is expressed as:

$$O_{r0}=[r \cos\theta \ r \sin\theta]^T;$$

the position of the first blocking point $O_{t1}$ is expressed as:

$$O_{t1}=[r \cos(\theta+\varnothing_1) \ r \sin(\theta+\varnothing_1)]^T;$$

the position of the second blocking point $O_{t2}$ is expressed as:

$$O_{t2}=[r\cos(\theta+\varnothing_2)\, r\sin(\theta+\varnothing_2)]^T;$$

the position of the third blocking point $O_{t3}$ is expressed as:

$$O_{t3}=[r\cos(\theta+\varnothing_3)\, r\sin(\theta+\varnothing_3)]^T;\text{ and}$$

the position of the fourth blocking point $O_{t4}$ is expressed as:

$$O_{t4}=[r\cos(\theta+\varnothing_4)\, r\sin(\theta+\varnothing_4)]^T.$$

Since the x coordinates of $O_{t1}$ and $O_{t4}$ relative to the center point $O_m$ of the coordinate system of the second motor 138 are the same (both are on the $X_s$ axis), the azimuth of the first point P1 on the tool 102 (that is, initial point $O_{t0}$) relative to the center point $O_m$ of the coordinate system of the second motor 138 can be obtained, wherein angle $\theta_1$ is expressed as:

$$\theta_1=\tan^{-1}((\cos\varnothing_1-\cos\varnothing_3)/(\sin\varnothing_1-\sin\varnothing_3)) \quad \text{Equation [1]}$$

Since the y coordinates of $O_{t2}$ and $O_{t4}$ relative to the center point $O_m$ of the coordinate system of the second motor 138 are the same (both are on the $Y_s$ axis), the azimuth of the first point P1 on the tool 102 (that is, initial point $O_{t0}$) relative to the center point $O_m$ of the coordinate system of the second motor 138 can be obtained, wherein angle $\theta_2$ is expressed as:

$$\theta_2=\tan^{-1}((-\sin\varnothing_2+\sin\varnothing_4)/(\cos\varnothing_2-\cos\varnothing_4)) \quad \text{Equation [2]}$$

Since the azimuth of the initial point $O_{t0}$ relative to the center point $O_m$ of the coordinate system of the second motor 138 can be obtained according to equation [1] and equation [2], the final azimuth can be obtained as: $\theta=(\theta_1+\theta_2)/2$. That is, the azimuth $\theta$ of the first point P1 on the tool 102 relative to the center point $O_m$ of the coordinate system of the second motor 138 is calculated and obtained.

Given that the x coordinates of $O_{t1}$ and $O_s$ relative to the center point $O_m$ of the coordinate system of the second motor 138 are the same (both are on the $X_s$ axis), the y coordinates of $O_{t2}$ and $O_s$ relative to the center point $O_m$ of the coordinate system of the second motor 138 are the same (both are on the $Y_s$ axis), the x coordinates of $O_{t3}$ and $O_s$ relative to the center point $O_m$ of the coordinate system of the second motor 138 are the same (both are on the $X_s$ axis), and the y coordinates of the $O_{t4}$ and $O_s$ relative to the center point $O_m$ of the coordinate system of the second motor 138 (both are on the $Y_s$ axis), equation [3] to equation [6] can be obtained as follows:

$$r_1=d_x/\cos(\theta+\varnothing_1) \quad \text{Equation [3]},$$

wherein $d_x$ represents the x axis deviation of the orifice center point $O_s$ relative to the center point $O_m$ of the coordinate system of the second motor 138;

$$r_2=d_y/\sin(\theta+\varnothing_2) \quad \text{Equation [4]},$$

wherein $d_y$ represents the y axis deviation of the orifice center point $O_s$ relative to the center point $O_m$ of the coordinate system of the second motor 138;

$$r_3=d_x/\cos(\theta+\varnothing_3) \quad \text{Equation [5]; and}$$

$$r_4=d_y/\sin(\theta+\varnothing_4) \quad \text{Equation [6]}.$$

Since the distance of the initial point $O_{t0}$ relative to the center point $O_m$ of the coordinate system of the second motor 138 can be obtained according to equation [3] to equation [6], the final distance, that is, the distance r of the first point P1 on the tool 102 relative to the center point $O_m$ of the coordinate system of the second motor 138 can be obtained as: $r=(r_1+r_2+r_3+r_4)/4$.

Figure 6A:
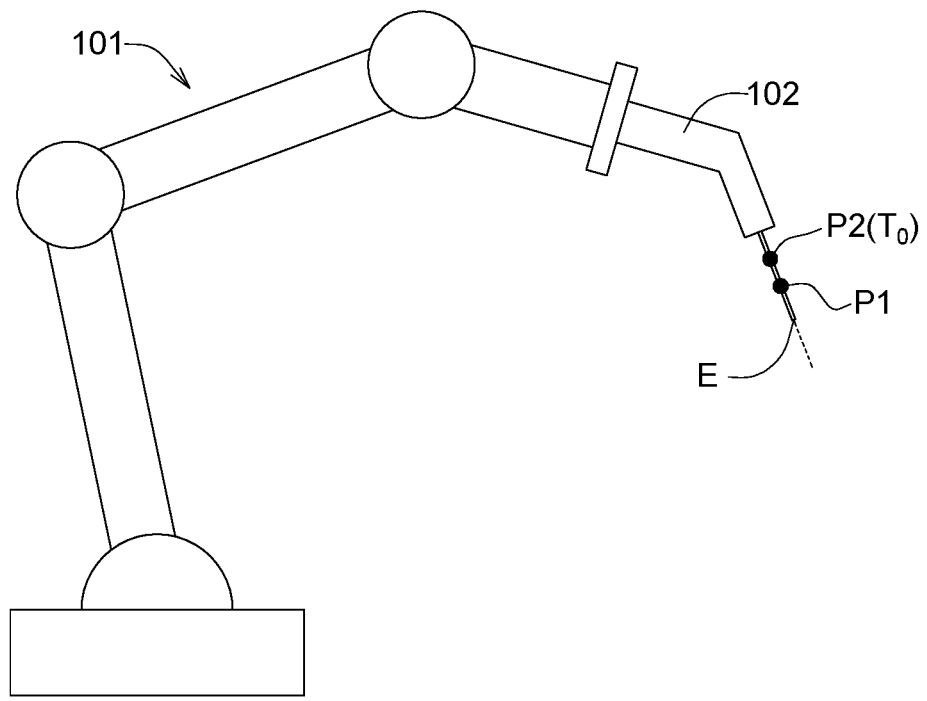
FIG. 6A is a schematic diagram of the positions of a first point and a second point on the tool.

Likewise, after the first motor 131 drives the uni-axis actuator 132 to translate the cross laser sensors 113 upward or downward, the position of the point by which the tool 102 intersecting the sensing plane of the cross laser sensors 113 changes (as indicated in FIG. 6A, the position moves to the second point P2 from the first point P1) and the steps of FIGS. 4A to 4E are repeated, so that the cross laser sensors 113 are rotated for one circle, and the new movement trajectory of the initial point $O_{t0}$ sequentially intersecting the cross laser lines 114 at the first blocking point $O_{t1}$, the second blocking point $O_{t2}$, the third blocking point $O_{t3}$, and the fourth blocking point $O_{t4}$ is observed according to relative movement (the second point P2 moves but the cross laser sensors 113 does not move). The processing unit 120 can calculate the coordinates of the second point P2 on the tool 102 relative to the center point $O_m$ of the coordinate system of the second motor 138 by resolving the equations of the movement trajectory disclosed above according to the second set of rotation angle signals of the second motor 138 ($\varnothing_1$, $\varnothing_2$, $\varnothing_3$, $\varnothing_4$). The calculation method is similar to the method for calculating the coordinates of the first point P1 relative to the center point $O_m$ of the coordinate system of the second motor 138, and the similarities are not repeated here. The above descriptions are equivalent to step S32 and step S34.

Referring to FIG. 6A, a schematic diagram of the first point P1 and the second point P2 on the tool 102 is shown. In step S36, when the coordinates of the first point P1 and the second point P2 on the tool 102 as well as the initial position information of the robotic arm 101 are known, the processing unit 120 can calculate the coordinates of the initial tool center point $T_o$ according to the conversion of coordinate systems (here, the initial tool center point $T_o$ and the second point P2 are the same point). Then, in step S38, after the coordinates of the initial tool center point $T_o$ are set to the controller of the robotic arm 101, the robotic arm 101 is moved for enabling the initial tool center point $T_o$ of the tool 102 to the orifice center point $O_s$ on the cross laser lines 114.

Figure 6B:
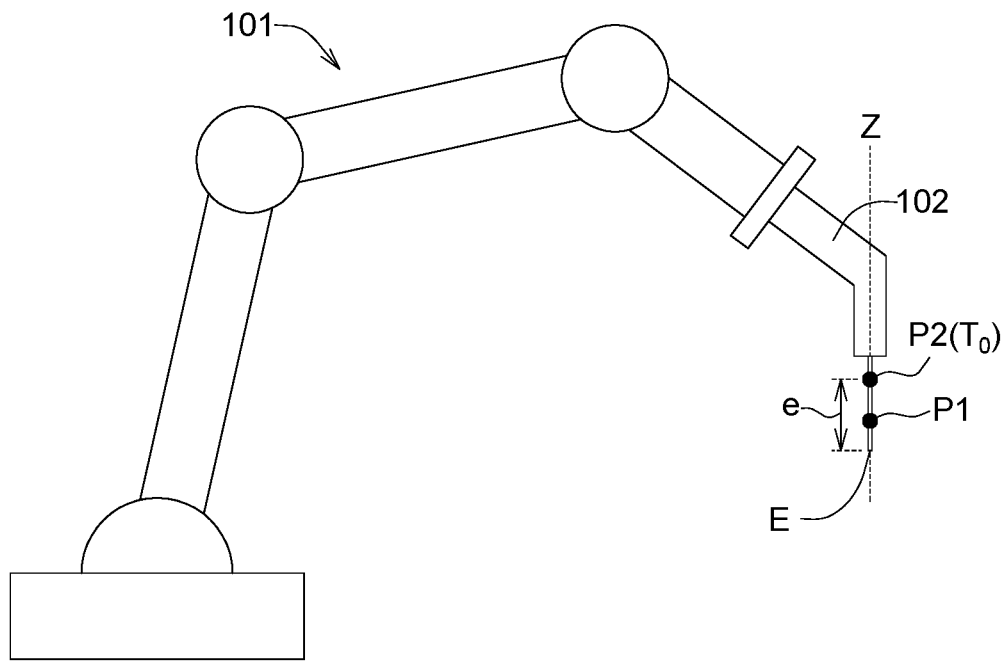
FIG. 6B is a schematic diagram of a tool after the calibration of the attitude angle of the tool.

Referring to FIG. 6B, a schematic diagram of a tool 102 after the calibration of the attitude angle is shown. In step S38, the attitude angle of the tool 102 is calibrated, so that the tool 102 is perpendicular to the sensing plane of the cross laser sensors 113 (remains on the Z axis). Then, in step S40, the cross laser sensors 113 are driven to translate downward by the first motor for moving the tool 102 from a position blocking the cross laser lines 114 to a position not blocking the cross laser lines 114 and the coordinates of the initial tool center point $T_o$ are calibrated according to the translated distance (the translated distance e from the point P2 to the terminal E) to obtain the final coordinates of the tool center point E.

The cross laser calibration device and the calibration system using the same disclosed in above embodiments of the present disclosure are capable of calibrating the tool center point of the tool on the robotic arm of different makes. During calibration process, the processing unit does not need to perform two-way communication with the controller of the robotic arm, so that the cross laser calibration device of the present embodiment can be shared by the robotic arms of different manufactures. Furthermore, since the calibration process is the same regardless of the manufactures of the robotic arms, calibration becomes more convenient and calibration cost is reduced.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A cross laser calibration device, comprising:
a coordinate orifice plate having an orifice center point;
a set of cross laser sensors arranged on the coordinate orifice plate to generate cross laser lines intersecting at the orifice center point; and
a rotational and translational movement mechanism used to drive the coordinate orifice plate and the set of cross laser sensors, wherein the rotational and translational movement mechanism comprises:
a first motor used to drive a uni-axis actuator to generate a translational movement in a first direction;
a second motor fixed on the uni-axis actuator to generate a rotational movement perpendicular to the first direction; and
a connecting rod connected between the second motor and the coordinate orifice plate,
wherein the orifice center point has an off-axis setting relative to a center point of the second motor.

2. The calibration device according to claim 1, wherein the set of cross laser sensors is driven by the second motor to revolve and rotate around the center point of the second motor to determine coordinates of a first point by which a tool intersects a sensing plane of the cross laser lines relative to the center point of a coordinate system of the second motor.

3. The calibration device according to claim 2, wherein the set of cross laser sensors is driven by the second motor to rotate around the center point of the second motor for one circle, and the tool intersects the cross laser lines along with a rotation of the cross laser lines to generate a first set of blocking signals and a first set of rotation angles of the second motor corresponding to the first set of blocking signals for a calculation of the coordinates of the first point by which the tool intersects the sensing plane of the cross laser lines relative to the center point of the coordinate system of the second motor.

4. The calibration device according to claim 3, wherein after the coordinate orifice plate and the set of cross laser sensors are driven by the first motor to translate the uni-axis actuator upward or downward, the set of cross laser sensors is driven by the second motor to rotate around the center point of the second motor for one circle, and the tool intersects the cross laser lines along with the rotation of the cross laser lines to generate a second set of blocking signals and a second set of rotation angles of the second motor corresponding to the second set of blocking signals for a calculation of coordinates of a second point on the tool by which the tool intersects the sensing plane of the cross laser lines relative to the center point of the coordinate system of the second motor.

5. The calibration device according to claim 4, wherein the second point on the tool sequentially intersects the cross laser lines at a first blocking point, a second blocking point, a third blocking point and a fourth blocking point; the calibration device describes equations of a movement trajectory of the first blocking point, the second blocking point, the third blocking point and the fourth blocking point using relative movement and obtains the coordinates of the second point by resolving the equation of the movement trajectory.

6. The calibration device according to claim 3, wherein the first point on the tool sequentially intersects the cross laser lines at a first blocking point, a second blocking point, a third blocking point and a fourth blocking point; the calibration device describes equations of a movement trajectory of the first blocking point, the second blocking point, the third blocking point and the fourth blocking point using relative movement and obtains the coordinates of the first point by resolving the equation of the movement trajectory.

7. A calibration system used to calibrate a tool center point of a robotic arm, wherein the calibration system comprises:
a coordinate orifice plate having an orifice center point;
a set of cross laser sensors arranged on the coordinate orifice plate to generate cross laser lines intersecting at the orifice center point; and
a rotational and translational movement mechanism used to drive the coordinate orifice plate and the set of cross laser sensors, wherein the rotational and translational movement mechanism comprises:
a first motor used to drive a uni-axis actuator to generate a translational movement in the first direction;
a second motor fixed on the uni-axis actuator to generate a rotational movement perpendicular to the first direction; and
a connecting rod connected between the second motor and the coordinate orifice plate, wherein, the orifice center point has an off-axis setting relative to a center point of the second motor; and
a processing unit used to receive an initial position information of the robotic arm and two rotation angle signals of the first motor and the second motor and to control the first motor and the second motor to rotate.

8. The calibration system according to claim 7, wherein the set of cross laser sensors is driven by the second motor to revolve and rotate around the center point of the second motor to determine coordinates of a first point by which a tool intersects a sensing plane of the cross laser lines relative to the center point of a coordinate system of the second motor.

9. The calibration system according to claim 8, wherein when the robotic arm moves the tool to be within a sensing range of the cross laser lines, the set of cross laser sensors is driven by the second motor to rotate around the center point of the second motor for one circle, and the tool intersects the cross laser lines along with a rotation of the cross laser lines to generate a first set of blocking signals and a first set of rotation angles of the second motor corresponding to the first set of blocking signals for a calculation of the coordinates of the first point by which the tool intersects the sensing plane of the cross laser lines relative to the center point of the coordinate system of the second motor.

10. The calibration system according to claim 9, wherein after the coordinate orifice plate and the set of cross laser sensors are driven by the first motor to translate the uni-axis actuator upward or downward, the cross laser sensor is driven by the second motor to rotate around the center point of the second motor for one circle, and the tool intersects the cross laser lines along with the rotation of the cross laser lines to generate a second set of blocking signals and a second set of rotation angles of the second motor corresponding to the second set of blocking signals for a calculation of coordinates of a second point on the tool by which the tool intersects the sensing plane of the cross laser lines relative to the center point of the coordinate system of the second motor.

11. The calibration system according to claim 10, wherein the processing unit calculates coordinates of an initial tool center point according to the coordinates of the first point on the tool relative to the center point of the coordinate system of the second motor, the coordinates of the second point on the tool relative to the center point of the coordinate system of the second motor, and the initial position information of the robotic arm.

12. The calibration system according to claim 11, wherein after setting the coordinates of the initial tool center point to a controller of the robotic arm, the robotic arm is moved for enabling the initial tool center point of the tool to be located at the orifice center point and then calibrates an attitude angle of the tool.

13. The calibration system according to claim 12, wherein the attitude angle of the tool is perpendicular to the sensing plane of the cross laser lines.

14. The calibration system according to claim 13, wherein the first motor drives the uni-axis actuator to translate the set of cross laser sensors downward for moving the tool from a position blocking the cross laser lines to a position not blocking the cross laser lines; the calibration system calibrates the coordinates of the initial tool center point according to a translated distance to obtain final coordinates of the tool center point.

15. The calibration system according to claim 10, wherein the second point on the tool sequentially intersects the cross laser lines at a first blocking point, a second blocking point, a third blocking point and a fourth blocking point; the calibration system describes equations of a movement trajectory of the first blocking point, the second blocking point, the third blocking point and the fourth blocking point using relative movement and obtains the coordinates of the second point by resolving the equation of the movement trajectory.

16. The calibration system according to claim 9, wherein the first point on the tool sequentially intersects the cross laser lines at a first blocking point, a second blocking point, a third blocking point and a fourth blocking point; the calibration system describes equations of a movement trajectory of the first blocking point, the second blocking point, the third blocking point and the fourth blocking point using relative movement and obtains the coordinates of the first point by resolving the equation of the movement trajectory.

* * * * *